United States Patent
Shin

(10) Patent No.: US 7,332,955 B2
(45) Date of Patent: Feb. 19, 2008

(54) HIGH VOLTAGE GENERATING CIRCUIT AND SEMICONDUCTOR MEMORY DEVICE HAVING THE SAME

(75) Inventor: Choong-Sun Shin, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 136 days.

(21) Appl. No.: 11/026,111

(22) Filed: Dec. 30, 2004

(65) Prior Publication Data

US 2005/0168266 A1     Aug. 4, 2005

(30) Foreign Application Priority Data

Feb. 2, 2004    (KR)    ............. 10-2004-0006795

(51) Int. Cl.
 *H03K 3/01* (2006.01)
(52) U.S. Cl. .................................. 327/534; 327/535
(58) Field of Classification Search .................. None
    See application file for complete search history.

(56) References Cited

U.S. PATENT DOCUMENTS

| | | | | |
|---|---|---|---|---|
| 5,699,018 A | * | 12/1997 | Yamamoto et al. ......... | 330/297 |
| 5,734,286 A | * | 3/1998 | Takeyama et al. .......... | 327/295 |
| 6,038,178 A | | 3/2000 | Oh .............................. | 365/189 |
| 2001/0038306 A1 | * | 11/2001 | Kim ............................ | 327/536 |
| 2004/0130384 A1 | * | 7/2004 | Sato et al. ................... | 327/536 |

FOREIGN PATENT DOCUMENTS

| | | |
|---|---|---|
| JP | 9-180448 | 7/1997 |
| KR | 20000-0002450 | 1/2000 |
| KR | 1020020002692 | 1/2002 |

\* cited by examiner

*Primary Examiner*—Tuan T Lam
(74) *Attorney, Agent, or Firm*—F. Chau & Associates, LLC

(57) ABSTRACT

A high voltage generating circuit and semiconductor memory device having the same are provided, where the high voltage generating circuit includes a pumping driving signal generating means for sequentially generating n-number of pumping driving signals in response to m-number of control signals, where n is greater than m; n-number of pumping control signal generating circuits for generating n-number of pumping control signals in response to the n-number of pumping driving signals, respectively; and n-number of pumping circuits for performing a pumping operation to pump a high voltage level in response to each of the n-number pumping control signals; such that it is possible to reduce a row cycle time regardless of a pumping cycle time, thereby achieving a high speed operation.

10 Claims, 9 Drawing Sheets

HIGH VOLTAGE GENERATING CIRCUIT AND SEMICONDUCTOR MEMORY DEVICE HAVING THE SAME

CROSS-REFERENCE TO RELATED APPLICATION

This application claims the benefit of foreign priority under 35 U.S.C. § 119 to Korean Patent Application No. 2004-6795, filed Feb. 2, 2004, the disclosure of which is hereby incorporated herein by reference in its entirety.

BACKGROUND OF THE INVENTION

1. Field of the Invention

The present disclosure relates to high voltage generating circuits and, more particularly, to high voltage generating circuits for generating voltages higher than a power supply voltage, and semiconductor memory devices having the same.

2. Description of the Related Art

In general, a cell access transistor connected to a word line of a semiconductor memory device includes a Negative-Channel Metal Oxide Semiconductor (NMOS) transistor. If a power voltage level is applied to a word line when data are written to a cell or when data stored in a cell are read, data of "high" level of a bit line is reduced in level by a threshold voltage of the NMOS transistor and then stored in a cell, and data of "high" level stored in a cell is reduced in level by a threshold voltage of the NMOS transistor and then transmitted to a bit line.

For the foregoing reason, a semiconductor memory device includes a high voltage generating circuit to apply a higher voltage than a power supply voltage to a word line, such that data of "high" level can be transmitted without a level loss.

There is a tendency for a power voltage level of a semiconductor memory device to be lowered. In addition, a small row cycle time is required for a high speed operation. However, a high voltage and a threshold voltage of the NMOS transistor are not lowered in proportion to a level drop of a power voltage. In order to pump a desired high voltage level, the number of pumping times of a high voltage generating circuit should be increased, whereby a pumping cycle time should be extended. However, the extended pumping cycle time leads to an extended row cycle time. This makes it difficult to configure a high speed semiconductor memory device.

FIG. 1 is a block diagram illustrating a conventional high voltage generating circuit, indicated generally by the reference numeral 100. The semiconductor memory device of FIG. 1 includes a pumping driving signal generating circuit 10, a pumping control signal generating circuit 12, and a pumping circuit 14. Functions of the components of the high voltage generating circuit of FIG. 1 are explained below.

The pumping driving signal generating circuit 10 generates a pumping driving signal BACT with a pumping cycle time when a bank selecting signal BA is generated. The pumping control signal generating circuit 12 generates pumping control signals CON1~n in response to the pumping driving signal BACT. The pumping circuit 14 operates to pump a high voltage VPP level in response to the pumping control signals CON1~n. In general, one high voltage generating circuit of FIG. 1 is provided for each of cell array banks of a semiconductor memory device.

FIG. 2 is a circuit diagram illustrating the pumping driving signal generating circuit of the high voltage generating circuit of FIG. 1, indicated generally by the reference numeral 200. The pumping driving signal generating circuit of FIG. 2 includes inverters I1 to I4, AND gates AND1 and AND2, and a D flip-flop DFF1. Functions of the components of the pumping driving signal generating circuit of FIG. 2 are explained below.

A circuit comprised of the AND gate AND1 and the inverter I1 generates a signal, which transits to a "high" level in response to a transition of a clock signal CK to a "high" level in the state that the pumping driving signal BACT maintains a "low" level. The D flip-flop DFF1 is reset to a "low" level during an initialization operation and receives and outputs the bank selecting signal BA when an output signal of the AND gate AND1 transits to a "high" level during a normal operation. A circuit comprised of the inverters I2 to I4 and the AND gate AND2 is a pulse generating circuit, transits the pumping driving signal BACT to a "high" level when an output signal of the D flip-flop DFF1 transits to a "high" level, and maintains a "high" level for a delay time of the inverters I2 and I4, and thereafter, transits the pumping driving signal BACT to a "low" level.

FIG. 3 is a timing diagram illustrating operation of the pumping driving signal generating circuit of FIG. 2, indicated generally by the reference numeral 300, where four memory cell banks are sequentially accessed.

In FIG. 3, a clock signal CK and a command signal COM are signals that are applied from an external portion of the semiconductor memory device. tCK denotes a cycle of the clock signal CK, tRDD denotes a minimum time spent until an active command ACT for accessing another memory cell array banks is accessed after an active command ACT for accessing a certain memory cell array bank is applied, tRC denotes a row cycle time spent until an active command for accessing the same memory cell array bank is applied after an active command ACT for accessing a certain memory cell array bank is applied, and tAKE denotes a pumping cycle time which is a minimum time required to pump a desired high voltage VPP level.

When the clock signal CK and the active command ACT are applied at a time interval tRRD of 2tCK from an external portion and bank addresses for selecting four memory cell banks are sequentially input, bank selecting signals BA1 to BA4 are sequentially generated. So, the pumping driving signal generating circuit of the respective memory cell array banks sequentially generates the pumping driving signals BACT1 to BACT4 which are pulse signals, in response to transition of the bank selecting signals BA1 to BA4 to a "high" level, respectively.

When the interval tRDD is set to 2tCK, a row cycle time tRC should be set to 8tCK. However, since a pumping cycle time tAKE for the high voltage generating circuit to pump a high voltage VPP level is 12tCK, it is impossible to set the row cycle time tRC to 8tCK.

Therefore, the conventional semiconductor memory device has a problem in that a row cycle time tRC cannot be reduced due to a pumping cycle time tAKE and thus a desired high speed operation cannot be achieved.

SUMMARY OF THE INVENTION

It is a feature of the present disclosure to provide a high voltage generating circuit that can reduce a row cycle time while maintaining a pumping cycle time.

It is another feature of the present disclosure to provide a semiconductor memory device having a high voltage generating circuit which can reduce a row cycle time while maintaining a pumping cycle time.

An embodiment of the present disclosure includes the above features, and provides a high voltage generating circuit, comprising: a pumping driving signal generating means for sequentially generating at least two pumping driving signals in response to a control signal; first and second pumping control signal generating circuits for generating at least two pumping control signals in response to the at least two pumping driving signals, respectively; and at least two pumping means for performing a pumping operation to pump a high voltage level in response to each of the at least two pumping control signals.

The pumping driving signal generating means includes a counter for sequentially activating the at least two signals in response to the control signal; and at least two pulse signal generator for generating the at least two pumping driving signals with a pumping cycle time in response to the at least two signals, respectively.

An embodiment of the present disclosure provides a high voltage generating circuit, comprising: a pumping driving signal generating means for sequentially generating n-number of pumping driving signals in response to m-number of control signals wherein n is greater than m; n-number of pumping control signal generating circuits for generating n-number of pumping control signals in response to the n-number of pumping driving signals, respectively; and n-number of pumping means for performing a pumping operation to pump a high voltage level in response to each of the n-number pumping control signals.

The pumping driving signal generating means includes a gate circuit for combining the m-number of control signals to generate a combined control signal; a counter for sequentially activating the n-number of signals in response to the combined control signal; and n-number of pulse signal generators for generating n-number of pumping driving signals with a pumping cycle time in response to the n-number of signals, respectively.

The counter is comprised of a ring counter which includes n-number of flip-flops to generate the n-number of signals, and one of the n-number of signals is set to a first level and the rest of the signals are set to a second level during an initialization, and the n-number of flip-flops perform the shifting operation to generate the n-number of signals in response to the combined control signals during a normal operation.

The present disclosure further provides a semiconductor memory device, comprising: a plurality of memory cell array banks; and a high voltage generating circuit provided for each of the plurality of the memory cell array banks, the high voltage generating circuit including a pumping driving signal generating means for sequentially generating at least two pumping driving signals in response to a control signal; first and second pumping control signal generating circuits for generating at least two pumping control signals in response to the at least two pumping driving signals, respectively; and at least two pumping means for performing a pumping operation to pump a high voltage level in response to each of the at least two pumping control signals.

The present disclosure further provides a semiconductor memory device, comprising: a plurality of memory cell array banks; and a high voltage generating circuit commonly provided for the plurality of the memory cell array banks, the high voltage generating circuit having a pumping driving signal generating means for sequentially generating n-number of pumping driving signals in response to m-number of control signals wherein n is greater than m; n-number of pumping control signal generating circuits for generating n-number of pumping control signals in response to the n-number of pumping driving signals, respectively; and n-number of pumping means for performing a pumping operation to pump a high voltage level in response to each of the n-number pumping control signals.

BRIEF DESCRIPTION OF THE DRAWINGS

The above and other features and advantages of the present disclosure will become more apparent to those of ordinary skill in the pertinent art by describing in detail preferred embodiments thereof with reference to the attached drawings, in which.

DETAILED DESCRIPTION OF PREFERRED EMBODIMENTS

Figure 1:
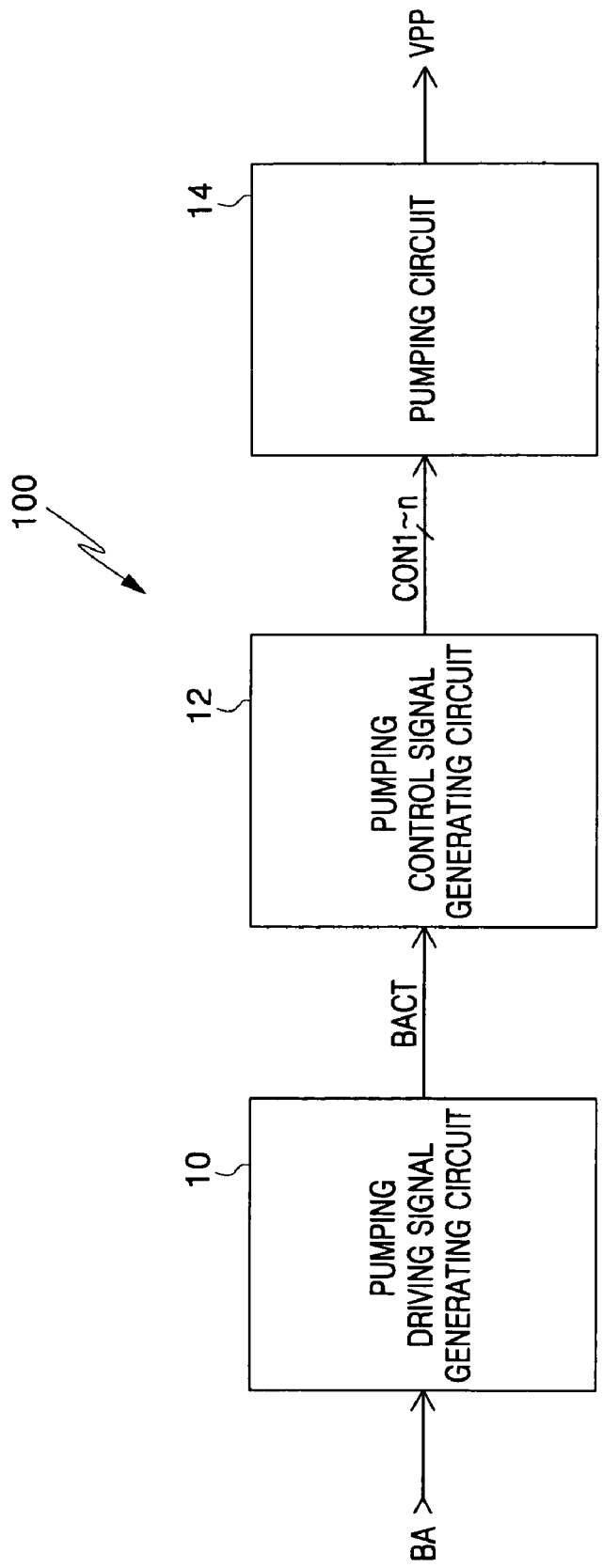
FIG. 1 is a block diagram illustrating a conventional high voltage generating circuit.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will convey the scope of the invention to those skilled in the art. In the drawings, the thickness of layers and regions may be exaggerated for clarity. Like reference numerals and/or characters may refer to like elements throughout the specification.

Figure 4:
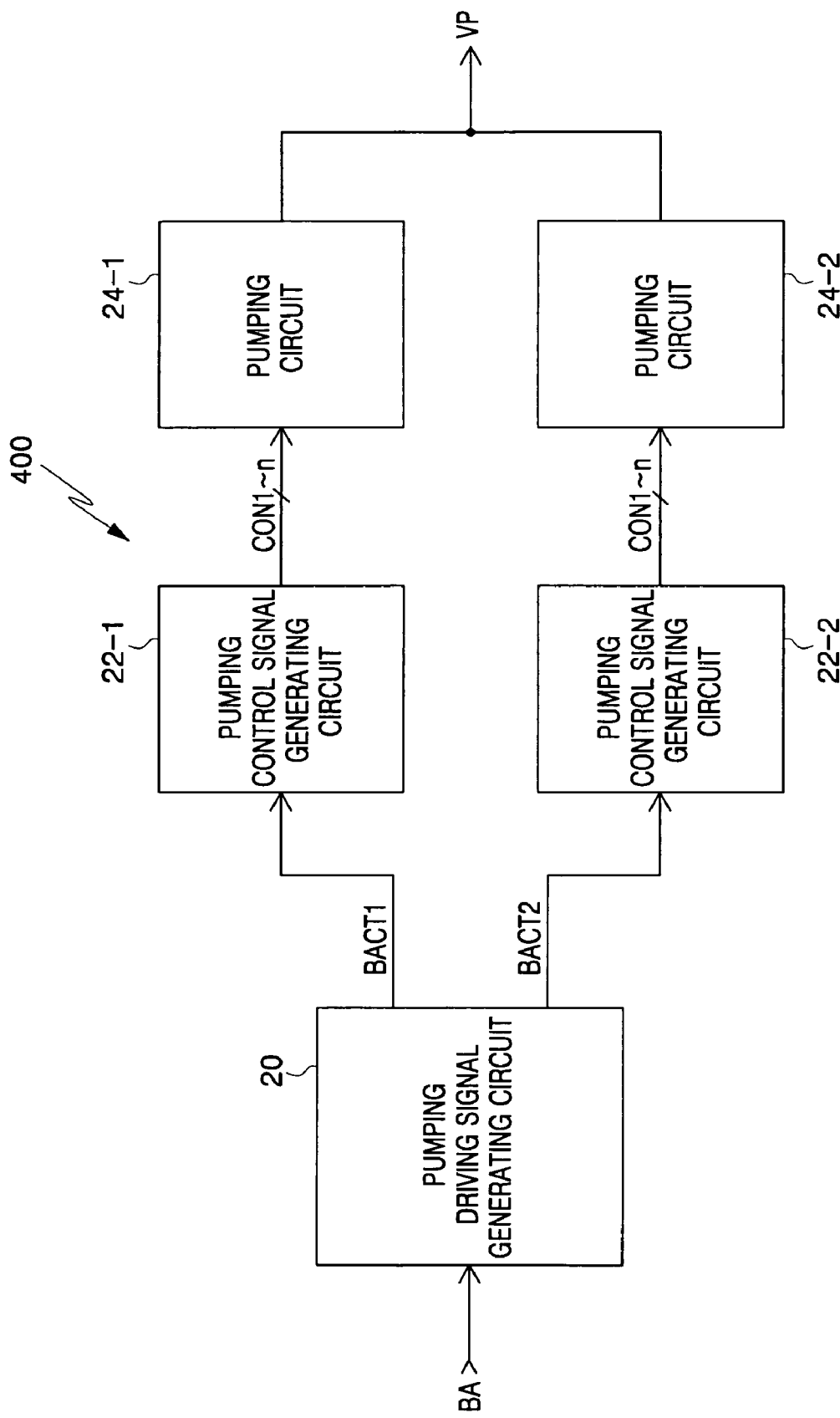
FIG. 4 is a block diagram illustrating a high voltage generating circuit according to an embodiment of the present disclosure.

FIG. 4 is a block diagram illustrating a high voltage generating circuit according to an embodiment of the present disclosure, indicated generally by the reference numeral 400. The high voltage generating circuit 400 of FIG. 4 includes a pumping driving signal generating circuit 20, pumping control signal generating circuits 22-1 and 22-2, and pumping circuits 24-1 and 24-2.

Functions of the components of the high voltage generating circuit of FIG. 4 are explained below. The pumping driving signal generating circuit 20 generates pumping driving signals BACT1 and BACT2 with a pumping cycle time when a bank selecting signal BA is generated. The pumping driving signals BACT1 and BACT2 are activated in turn.

The pumping control signal generating circuits 22-1 and 22-2 generate pumping control signals CON1~n in response to the respective pumping driving signals BACT1 and BACT2, respectively. The pumping circuits 24-1 and 24-2 operate to pump a high voltage VPP level in response to respective pumping control signals CON1~n.

The high voltage generating circuit of FIG. 4 is provided for each of the memory cell array banks. Two pumping circuits are provided for one memory cell array bank, and two pumping circuits operate in turn.

Figure 5:
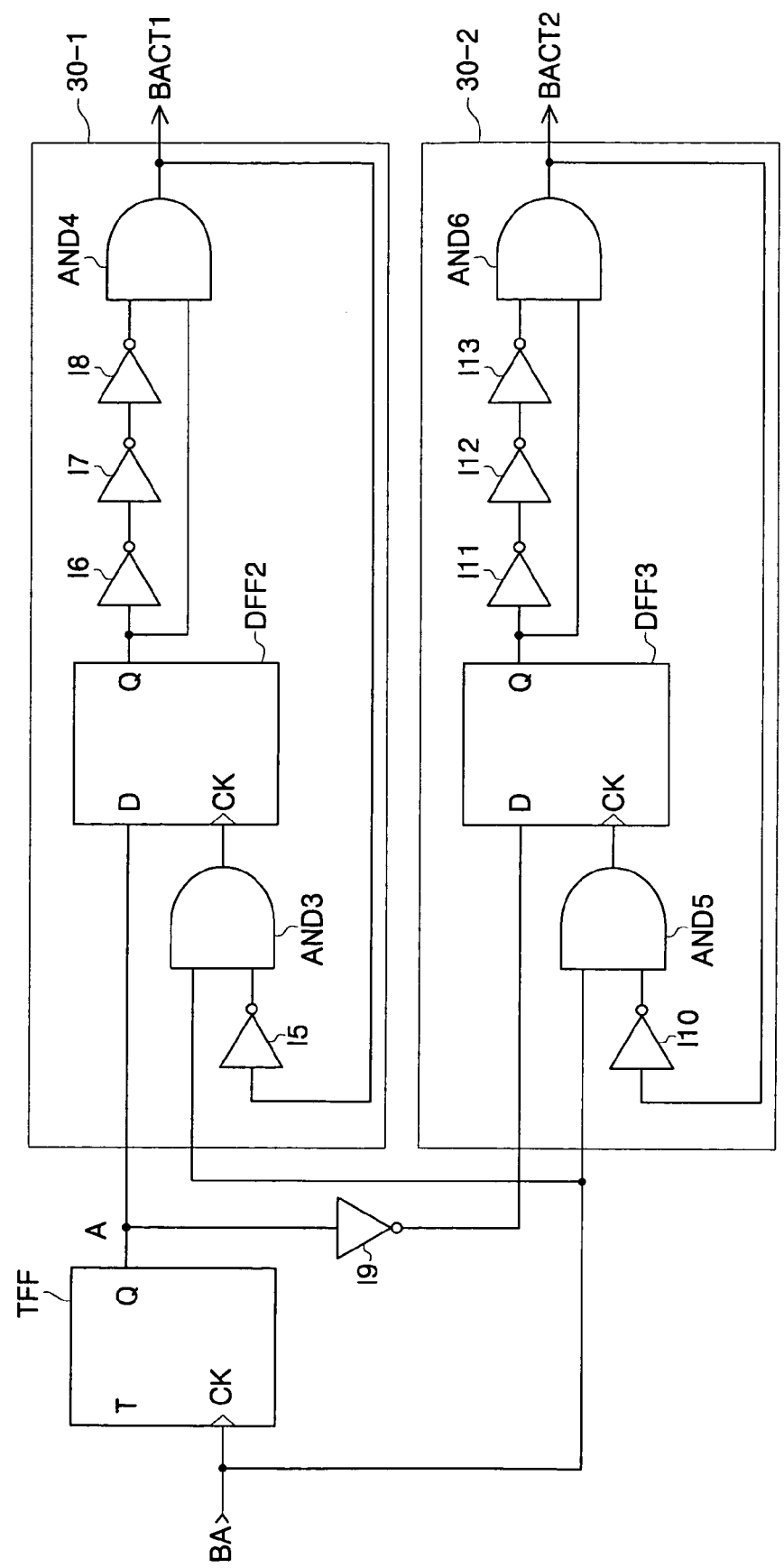
FIG. 5 is a circuit diagram illustrating a pumping driving signal generating circuit of the high voltage generating circuit of FIG. 4.

FIG. 5 is a circuit diagram illustrating the pumping driving signal generating circuit of the high voltage generating circuit of FIG. 4, indicated generally by the reference numeral 500. The pumping driving signal generating circuit 500 of FIG. 5 includes a T flip-flop TFF, an inverter I9, a first circuit 30-1, and a second circuit 30-2. The first circuit 30-1 includes inverters I5 to I8, AND gates AND3 and AND4, and a D flip-flop DFF2, and the second circuit 30-2 includes inverters I10 to I13, AND gates AND5 and AND6, and a D flip-flop DFF3.

Figure 2:
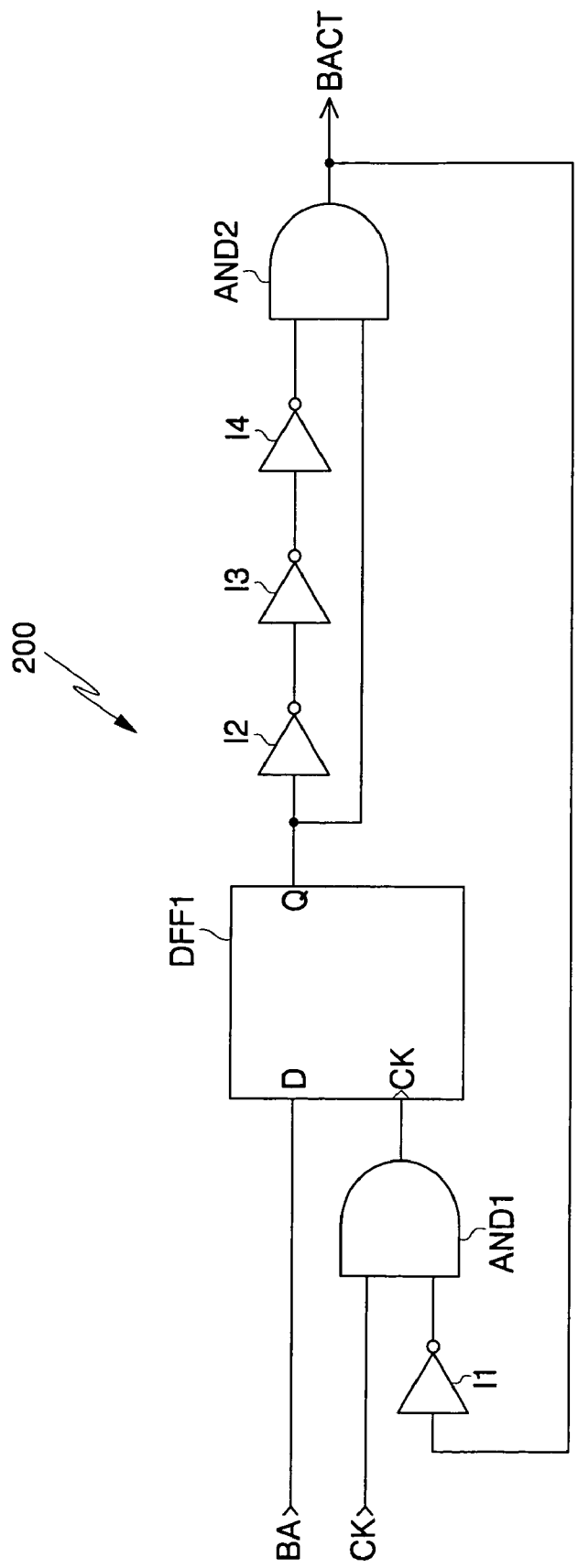
FIG. 2 is a circuit diagram illustrating a pumping driving signal generating circuit of the high voltage generating circuit of FIG. 1.

Functions of the components of the pumping driving signal generating circuit of FIG. 5 are explained below. The T flip-flop TFF is reset to a "low" level during an initialization operation and toggles an output signal A when a bank selecting signal BA transits to a "high" level during a normal operation. The first and second circuits 30-1 and 30-2 perform the same operation as the pumping driving signal generating circuit of FIG. 2, in turn. Therefore, operation of the first and second circuits 30-1 and 30-2 is easily understood with reference to operation of the pumping driving signal generating circuit of FIG. 2. That is, the first circuit 30-1 generates a pumping driving signal BACT1 with a pumping cycle time in response to a transition of the output signal A to a "high" level, and the second circuit 30-2 generates a pumping driving signal BACT2 with a pumping cycle time in response to a transition of the output signal A to a "low" level.

Figure 3:
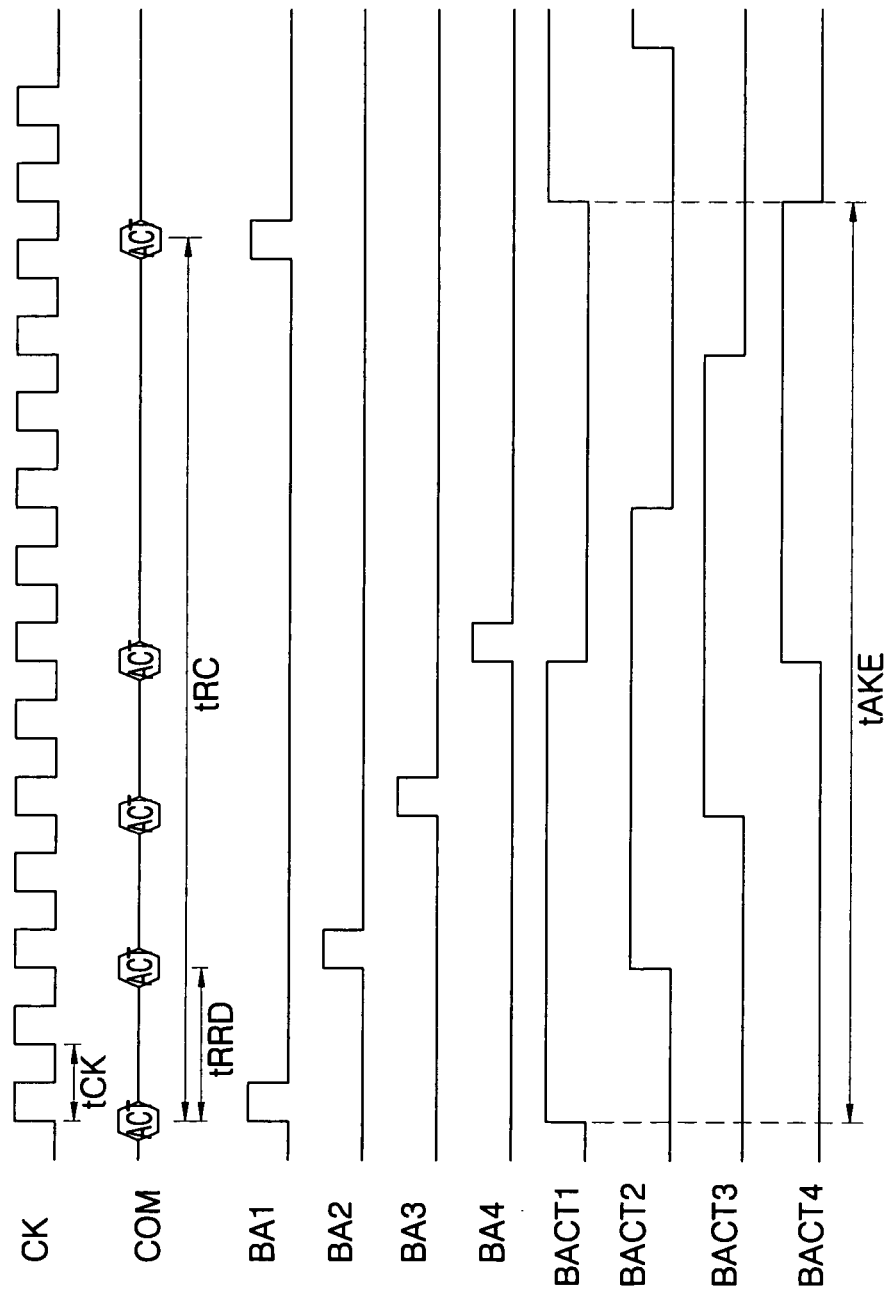
FIG. 3 is a timing diagram illustrating operation of the pumping driving signal generating circuit of FIG. 2.
Figure 6:
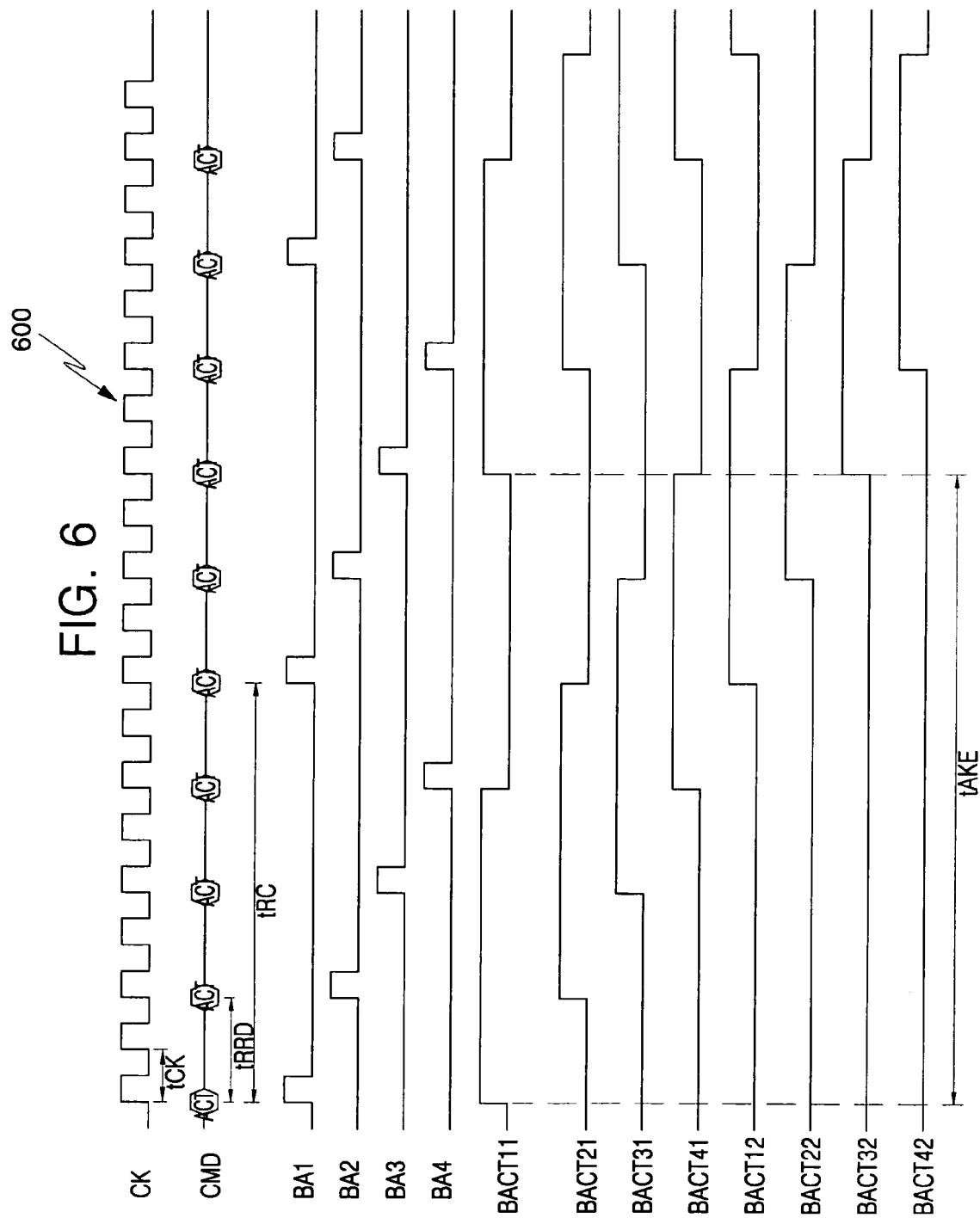
FIG. 6 is a timing diagram illustrating operation of the pumping driving signal generating circuit of FIG. 5.

FIG. 6 is a timing diagram illustrating operation of the pumping driving signal generating circuit of FIG. 5, indicated generally by the reference numeral 600, where four memory cell array banks are sequentially accessed. The reference numerals and/or characters of FIG. 6 denote the same signals as the reference numerals and/or characters of FIG. 3.

When a clock signal CK and an active command ACT are applied at an interval tRDD of 2tCK and bank addresses for selecting four memory cell array banks are sequentially inputted, bank selecting signals BA1 to BA4 are sequentially generated. The first circuit 30-1 of the respective pumping driving signal generating circuit of the memory cell array bank sequentially generates pumping driving signals BACT11 to BACT41 which are pulse signals in response to a transition of the banks selecting signals BA1 to BA4 to a "high" level. Then, the pumping circuit 24-1 of FIG. 4 performs a pumping operation in response to the pumping control signals CON1~n.

Thereafter, when a clock signal CK and an active command ACT are applied at an interval tRDD of 2tCK and bank addresses for selecting four memory cell array banks are sequentially inputted, bank selecting signals BA1 to BA4 are sequentially generated. The second circuit 30-2 of the respective pumping driving signal generating circuit of the memory cell array bank sequentially generates pumping driving signals BACT12 to BACT42 which are pulse signals in response to a transition of the banks selecting signals BA1 to BA4 to a "high" level. Then, the pumping circuit 24-2 of FIG. 4 performs a pumping operation in response to the pumping control signals CON1~n.

Consequently, when the semiconductor memory device is comprised of four memory cell array banks and a time tRDD is set to 2tCK, it is possible to set a row cycle time tRC to 8tCK. At this time, a pumping cycle time tAKE is maintained to 12tCK like the conventional semiconductor memory device, so thereby pumping a desired high voltage level.

The high voltage generating circuit of the semiconductor memory device according to the present disclosure has two pumping circuits for one memory cell array bank and operates the two pumping circuits in turn, thereby reducing a row cycle time tRC without reducing a pumping cycle time tAKE. As a result, a high speed semiconductor memory device can be implemented since a row cycle time tRC can be reduced more than the pumping cycle time tAKE.

In an alternate embodiment of the present disclosure that is not specifically shown, the high voltage generating circuit of the semiconductor memory device can be configured such that three pumping circuits are provided for one memory cell array bank and three pumping circuit are sequentially operated.

Figure 7:
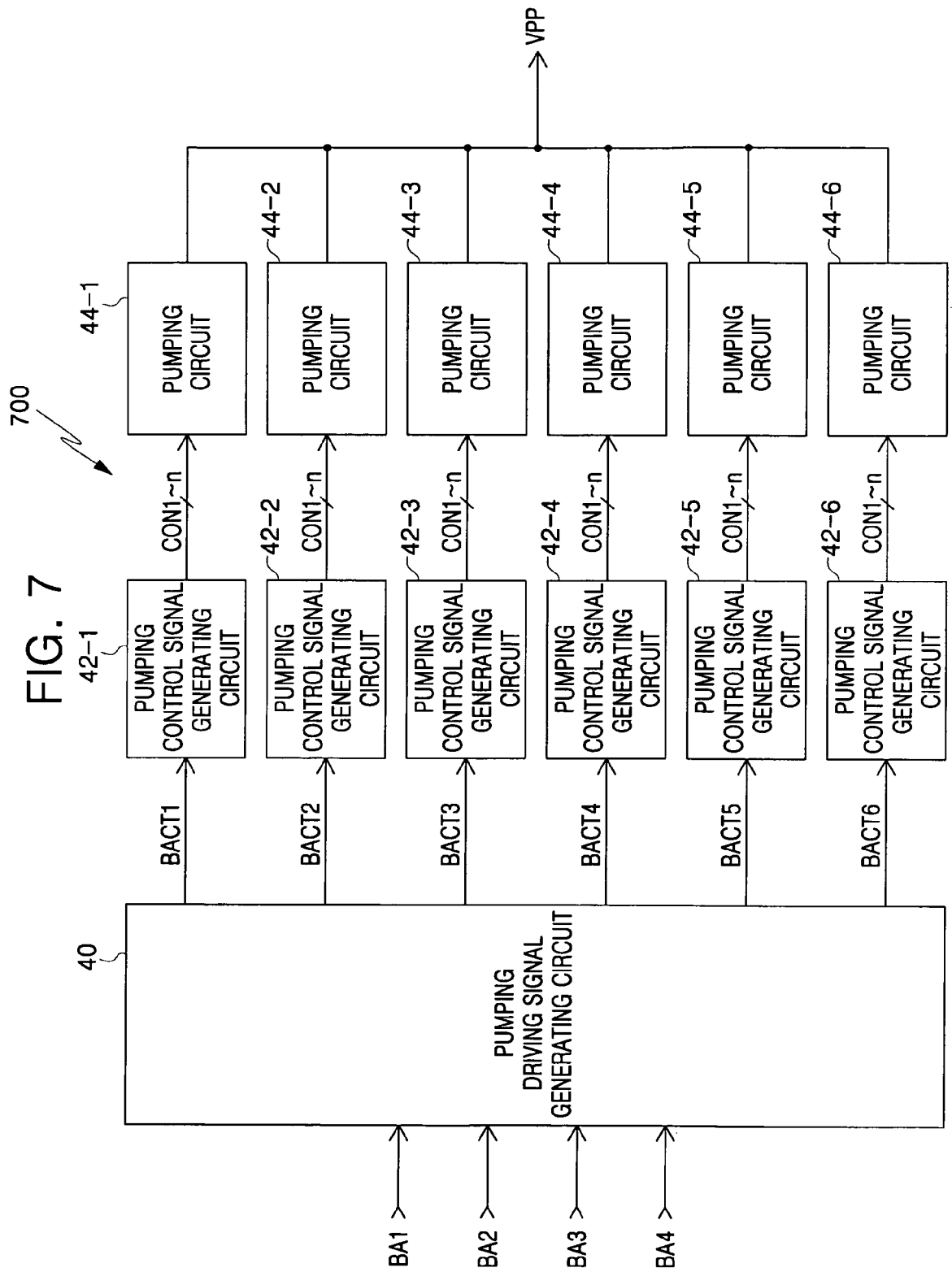
FIG. 7 is a block diagram illustrating a high voltage generating circuit according to another embodiment of the present disclosure.

FIG. 7 is a block diagram illustrating a high voltage generating circuit according to another embodiment of the present disclosure, indicated generally by the reference numeral 700. The high voltage generating circuit 700 of FIG. 7 includes a pumping driving signal generating circuit 40, pumping control signal generating circuits 42-1 to 42-6, and pumping circuits 44-1 to 44-6.

Functions of the components of the high voltage generating circuit of FIG. 7 are explained below. The pumping driving signal generating circuit 40 receives bank selecting signals BA1 to BA4 and sequentially activates six pumping driving signals BACT1 to BACT6 with pumping cycle time whenever the bank selecting signals BA1 to BA6 are activated. The pumping control signal generating circuits 42-1 to 42-6 generate pumping control signals CON1~n in response to the pumping driving signals BACT1 to BACT6, respectively. Each of the pumping circuits 44-1 to 44-6 perform the pumping operation to pump a high voltage VPP level in response to the pumping control signals CON1~n.

The high voltage generating circuit of FIG. 7 is commonly provided for four memory cell array banks. That is, the high voltage generating circuit of FIG. 4 is provided for each of the four memory cell array banks, but one high voltage generating circuit of FIG. 7 is provided for the four memory cell array banks.

Figure 8:
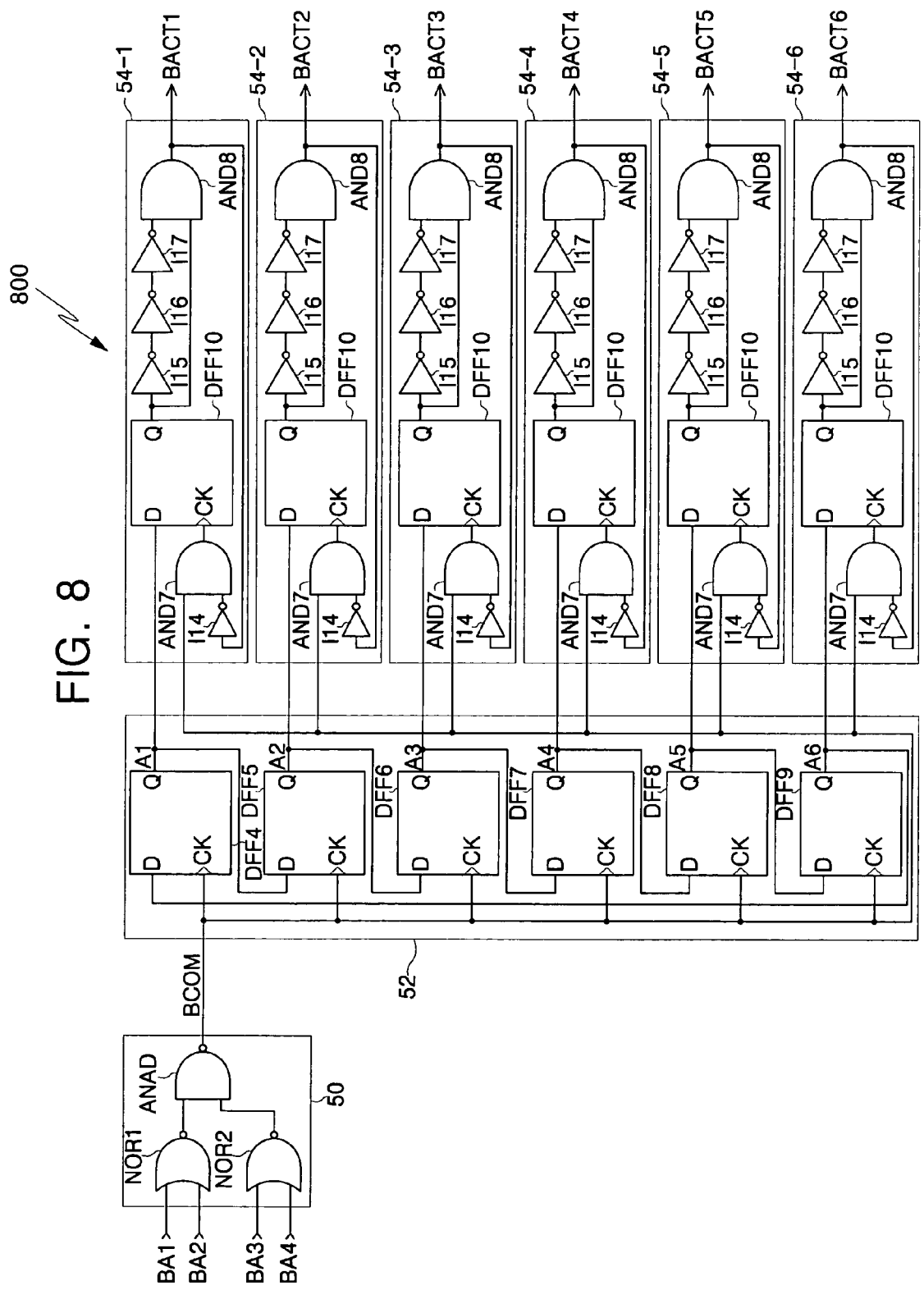
FIG. 8 is a circuit diagram illustrating a pumping driving signal generating circuit of the high voltage generating circuit of FIG. 7.

FIG. 8 is a circuit diagram illustrating the pumping driving signal generating circuit of the high voltage generating circuit of FIG. 7, indicated generally by the reference numeral 800. The pumping driving signal generating circuit 800 of FIG. 8 includes a bank combination signal generating circuit 50, a counter 52, and first to sixth circuits 54-1 to 54-6.

The bank combination signal generating circuit 50 includes NOR gates NOR1 and NOR2 and a NAND gate NAND. The counter 52 is a ring counter comprised of D flip-flops DFF4 to DFF9. Each of the first to sixth circuits 54-1 to 54-6 includes inverters I14 to I17, AND gates AND7 and AND8, and a D flip-flop DFF10.

Functions of the components of the pumping driving signal generating circuit of FIG. 8 are explained below. The bank combination signal generating circuit 50 ORs the bank selecting signals BA1 to BA4 to generate a bank combination signal BCOM. In the counter 52, during an initialization operation, an output signal of one of the D flip-flops DFF4 to DFF9 is set to "high" level, and output signals of the rest of the D flip-flops are set to "low" level. During a normal operation, the counter 52 shifts the output signals A1 to A6 in response to a transition of the bank combination signal BCOM to a "high" level. The first to sixth circuits 54-1 to 54-6 sequentially generate the pumping driving signals BACT1 to BACT6 with the pumping cycle time in response to a transition of the output signal A1 to a "high" level, respectively.

Therefore, the pumping driving signal generating circuit of FIG. 8 makes one of the pumping driving signals BACT1 to BACT6 have a "high" level whenever the bank selecting signals BA1 to BA4 for selecting the four memory cell array banks are generated.

Figure 9:
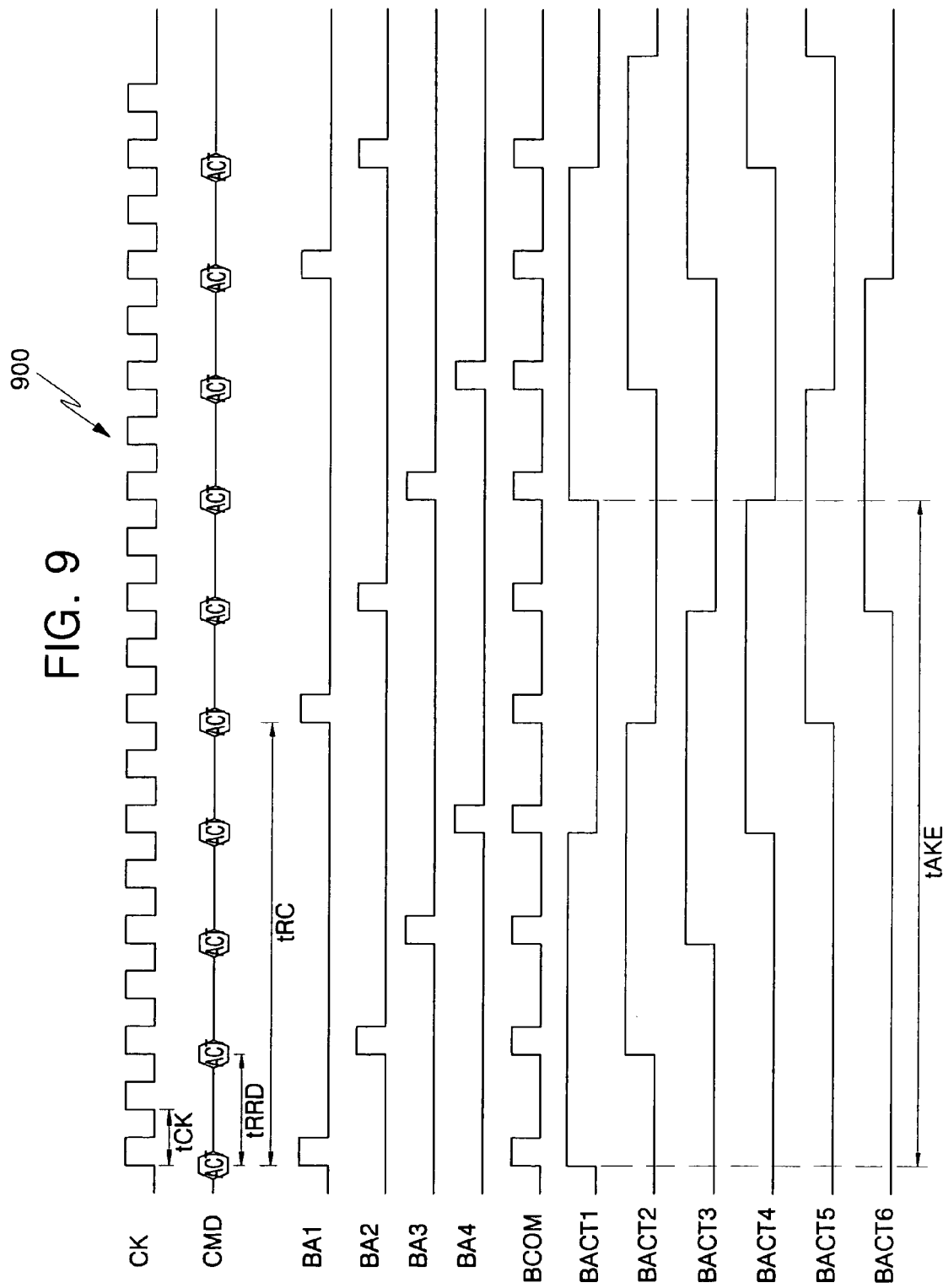
FIG. 9 is a timing diagram illustrating operation of the pumping driving signal generating circuit of FIG. 8.

FIG. 9 is a timing diagram illustrating operation of the pumping driving signal generating circuit of FIG. 8, indicated generally by the reference numeral 900, where four memory cell array banks are sequentially accessed. The reference numerals and/or characters of FIG. 9 denote the same signals as the reference numerals and/or characters of FIG. 3.

When a clock signal CK and an active command ACT are applied at an interval tRDD of 2tCK and bank addresses for selecting four memory cell array banks are sequentially input, bank selecting signals BA1 to BA4 are sequentially generated. The pumping driving signal generating circuit generates the pumping driving signals BACT1 to BACT4, which are pulse signals that sequentially transit to a "high" level in response to a transition of the bank selecting signals BA1 to BA4 to a "high" level. Then, the pumping circuits 44-1 to 44-4 perform a pumping operation in response to the pumping control signals CON1~n.

Thereafter, when a clock signal CK and an active command ACT are applied at an interval tRDD of 2tCK and bank addresses for selecting four memory cell array banks are sequentially inputted, bank selecting signals BA1 to BA4 are sequentially generated. The respective pumping driving signal generating circuit of the memory cell array bank sequentially generates pumping driving signals BACT5, BACT6, BACT1, and BACT2 which are pulse signals which transit to a "high" level in response to a transition of the banks selecting signals BA1 to BA4 to a "high" level. Then, the pumping circuits 44-5, 44-6, 44-1, and 44-2 perform a pumping operation in response to the pumping control signals CON1~n.

Consequently, when the semiconductor memory device is comprised of four memory cell array banks and a time tRDD is set to 2tCK, it is possible to set a row cycle time tRC to 8tCK at the minimum. At this time, even though a pumping cycle time tAKE is maintained to 12tCK like the conventional semiconductor memory device, it is possible to pump a desired high voltage level.

The high voltage generating circuit of the semiconductor memory device of the present disclosure is not configured such that one pumping circuit is provided for one memory cell array bank, but such that at least one supplemental pumping circuit is provided and a pumping operation is performed using a supplemental pumping circuit when one pumping circuit performs a pumping operation. Therefore, it is possible to reduce a row cycle time without reducing a pumping cycle time.

As described herein before, the high voltage generating circuits and the semiconductor memory devices according to the present disclosure can reduce row cycle times independent of pumping cycle times, thereby achieving high speed operation.

Preferred embodiments of the present invention have been disclosed herein and, although specific terms are employed, they are used and shall be interpreted in a generic and descriptive sense only, and not for the purpose of limitation. Accordingly, it shall be understood by those of ordinary skill in the pertinent art that various changes in form and details may be made herein without departing from the scope and spirit of the present invention, as defined by the appended claims.

What is claimed is:

1. A high voltage generating circuit, comprising:
   a pumping driving signal generator for sequentially generating n-number of signals whenever at least one of m-number of control signals is activated, wherein n is greater than m, and for generating n-number of pumping driving signals with a pumping cycle time in response to the n-number of signals;
   n-number of pumping control signal generating circuits for generating a plurality of pumping control signals in response to the n-number of pumping driving signals, respectively; and
   n-number of pumps for performing a pumping operation to pump a high voltage level in response to each of the n-number pumping control signals,
   wherein the pumping driving signal generator comprises a gate circuit for combining the m-number of control signals to generate a combined control signal, a counter for sequentially activating the n-number of signals in response to the combined control signal, and n-number of pulse signal generators for generating n-number of pumping driving signals with a pumping cycle time in response to the n-number of signals, respectively.

2. The circuit of claim 1, wherein the counter comprises a ring counter that includes n-number of flip-flops to generate the n-number of signals, and one of the n-number of signals is set to a first level and the rest of the signals are set to a second level during an initialization, and the n-number of flip-flops perform the shifting operation to generate the n-number of signals in response to the combined control signal during a normal operation.

3. A semiconductor memory device, comprising:
   a plurality of memory cell array banks; and
   a high voltage generating circuit commonly provided for the plurality of the memory cell array banks, the high voltage generating circuit comprising:
      a pumping driving signal generator for sequentially generating n-number of signals whenever at least one of m-number of control signals is activated, wherein n is greater than m, and for generating n-number of pumping driving signals with a pumping cycle time in response to the n-number of signals;
      n-number of pumping control signal generating circuits for generating a plurality of pumping control signals in response to the n-number of pumping driving signals, respectively; and
      n-number of pumps for performing a pumping operation to pump a high voltage level in response to each of the plurality of pumping control signals, wherein the pumping driving signal generator comprises a gate circuit for combining the m-number of control signals to generate a combined control signal, a counter for sequentially activating the n-number of signals in response to the combined control signal, and n-number of pulse signal generators for generating n-number of pumping driving signals with a pumping cycle time in response to the n-number of signals, respectively.

4. The device of claim 3, wherein the counter comprises a ring counter that includes n-number of flip-flops to generate the n-number of signals, where one of the n-number of signals is set to a first level and the rest of the signals are set to a second level during an initialization, and the n-number of flip-flops perform the shifting operation to generate the n-number of signals in response to the combined control signal during a normal operation.

5. A high voltage generating circuit, comprising:
a pumping drive signal generating circuit for sequentially generating at least two first signals whenever at least one control signal is activated, and for sequentially generating a plurality of second signals with a pumping cycle time in response to the at least two first signals;
a plurality of pumping control signal generating circuits in signal communication with the pumping drive signal generating circuit for generating a plurality of third signals in response to the plurality of second signals, respectively; and
a plurality of pumping circuits each in signal communication with a corresponding one of the plurality of pumping control signal generating circuits, respectively, for pumping a voltage higher than a power supply level in response to each of the plurality of third signals,
wherein the pumping drive signal generating circuit comprises a gate circuit for combining m-number of control signals to generate a combined control signal, a counter for sequentially activating n-number of first signals in response to the combined control signal, and n-number of pulse signal generators for generating n-number of second signals with a pumping cycle time in response to the n-number of first signals, respectively.

6. A circuit as defined in claim 5 wherein:
the at least one first signal is a control signal;
the plurality of second signals is two pumping drive signals; and
the plurality of third signals is two pumping control signals.

7. A circuit as defined in claim 5, further comprising a plurality of memory cell array banks, each disposed in signal communication with at least one of the plurality of pumping circuits.

8. A circuit as defined in claim 7, wherein the plurality of second signals is n-number of sequentially generated pumping driving signals responsive to m-number of control signals wherein n is greater than m; and
the plurality of third signals is a plurality of pumping control signals responsive to the n-number of pumping driving signals, respectively.

9. A circuit as defined in claim 8, wherein the plurality of pumping circuits is n-number of pumping circuits for performing a pumping operation to pump a voltage level higher than a power supply voltage level in response to each of the plurality of pumping control signals.

10. A circuit as defined in claim 9, wherein the counter comprises a ring counter having n-number of flip-flops to generate the n-number of pumping drive signals, respectively, where one of the n-number of signals is set to a first level and the other signals are set to a second level during an initialization, and the n-number of flip-flops perform a shifting operation to generate the n-number of pumping drive signals in response to the combined control signal during a normal operation.

* * * * *